3,828,023
PROCESS FOR PREPARING CYCLIC OLIGOMERS
OF N-SUBSTITUTED AZIRIDINES
Sally P. Cornier, Sanford, and Charles E. Wymore, Midland, Mich., assignors to The Dow Chemical Company, Midland, Mich.
No Drawing. Filed Sept. 13, 1971, Ser. No. 180,235
Int. Cl. C07d 53/00
U.S. Cl. 260—239 BC                9 Claims

ABSTRACT OF THE DISCLOSURE

Cyclic oligomers of N-alkylaziridines and N-aralkylaziridines are prepared by contacting the N-substituted aziridine monomer with an alkylaluminum catalyst at a temperature sufficient to cause reaction. For example, the cyclic tetramer of N-ethylaziridine was prepared in high yields by contacting N-ethylaziridine with triisobutylaluminum at 140°–150° C. for 20 hours under autogenous pressure.

BACKGROUND OF THE INVENTION

The synthesis of 1,4,7,10-tetrabenzyl-1,4,7,10-tetraazocyclododecane was reported by G. R. Hansen and T. E. Burg, J. Heterocyclic Chem. 5 (2), 305 1968). Their synthesis comprised refluxing a mixture of N-benzylaziridine and p-toluenesulfonic acid in aqueous ethanol.

S. Tsuboyama et al. in *Tetrahedron Letters*, No. 16, 1367 (1970) reported the synthesis of 1,4,7,10-tetrabenzyl-2,5,8,11-tetra-(R)-ethyl-1,4,7,10-tetraazocyclododecane in about 30 percent yield from N-benzyl-2-ethylaziridine using $BF_3$·etherate as the catalyst.

SUMMARY OF THE INVENTION

It has now been discovered that cyclic oligomers of N-alkyl- and N-aralkylaziridines can be prepared by contacting the N-substituted aziridine monomers with an alkyl-aluminum catalyst at a temperature sufficient to cause reaction.

The cyclic oligomers thus formed may be represented by the formula

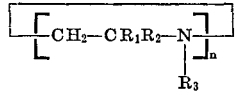

wherein $R_1$ and $R_2$ are hydrogen, methyl or ethyl; $R_3$ is an alkyl or aralkyl radical; and $n$ is an integer of from 2 to about 10. The predominant product, however, is usually the cyclic tetramer ($n=4$). The cyclic oligomers contain tertiary nitrogens along the backbone and thus may be used in many conventional reactions involving tertiary amines. For example, the cyclic oligomers may be used in neutralizing acids, such as HCl, and removing acidic gases, such as $SO_2$, from stack gas, and are also useful as epoxy curing agents.

The N-substituted aziridine reactants useful herein are represented by the formula (I) 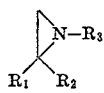

wherein $R_1$ and $R_2$ are hydrogen, methyl or ethyl and $R_3$ is alkyl or aralkyl. Examples of suitable such aziridines include those in (I) wherein $R_1$, $R_2$ and $R_3$ have the following values:

| $R_1$ | $R_2$ | $R_3$ |
|---|---|---|
| H | H | $C_2H_5$ |
| H | H | $C_4H_9$ |
| H | H | $C_{12}H_{25}$ |
| H | H | $CH_2C_6H_5$ |
| H | H | $CH_2CH_2C_6H_5$ |
| H | H | $CH_2C_6H_4$—$C_4H_9$ |
| $CH_3$ | H | $C_2H_5$ |
| $CH_3$ | $CH_3$ | $C_2H_5$ |
| $CH_3$ | H | $CH_2CH_2C_6H_5$ |
| $C_2H_5$ | H | $C_6H_{13}$ |
| $C_2H_5$ | $CH_3$ | $CH_2C_6H_5$ | and other compounds that will be readily suggested to those skilled in the art. The preferred aziridines are those wherein $R_1$ and $R_2$ are hydrogen and $R_3$ is alkyl or aralkyl of from 2 to 8 carbon atoms. The most preferred aziridines are N-ethylaziridine, N-benzylaziridine or N-phenethylaziridine.

The alkylaluminum catalysts useful herein are known compounds and comprise mono-, di- and trialkyl-aluminums. The trialkylaluminum compounds are preferred. Typically, the catalysts are liquids which decompose in the presence of water. A substantially anhydrous system is therefore preferred to maximize product yields. The trialkylaluminum compounds having $C_1$ to $C_4$ alkyl groups are preferred catalysts with triethyl- and triisobutyl-aluminum being the most preferred. Examples of suitable catalysts include trimethyl-, triethyl-, tripropyl-, tributyl-, triisobutyl-, trihexyl-, etc., dimethylethyl-, dipropylmethylaluminum, etc., dimethylaluminum hydride, dibutylaluminum hydride, dimethylaluminum chloride, and other like compounds.

The alkylaluminum compounds are generally used in small but catalytic amounts. Amounts of from about 0.05 up to about 20 mole percent, based on aziridine monomer, are illustrative, although amounts in the range of from about 3 to 6 mole percent are generally preferred.

The process parameters, such as temperature, pressure, etc. may be adjusted to convenience. Satisfactory reaction rates have been observed at reaction temperatures of from about 125° C. up to about 200° C. and preferred rates have been obtained at temperatures of about 140–160° C. Superatmospheric pressures are generally used in order to maintain the reaction mixture in a liquid phase. Autogenous pressures can be used and are preferred. Under the above conditions of temperature and pressure, reaction times of from 8 to 24 hours are common. The process may be conducted in an inert solvent, such as benzene, toluene, etc. if desired.

The following examples further illustrate the invention:

Example 1.—Cyclic Oligomers of N-Ethylaziridine

N-ethylaziridine (200 ml.) and triisobutylaluminum (18.2 ml.) were charged to a stainless steel Parr bomb (473 ml. capacity), and the reaction mixture warmed for 20 hours at approximately 145° C. with stirring. Distillation of the product under reduced pressure gave 110 ml. of cyclic tetramer (b.p. 95° C. at 0.04 mm.) and 15 ml. of the cyclic trimer (b.p. 45° C. at 0.04 mm.) as the predominant products.

Example 2.—Cyclic Oligomers of N-Benzylaziridine

In like manner, the cyclic tetramer of N-benzylaziridine was obtained in about 60 percent of theoretical yield as a white crystalline solid melting at 142–143° C.

Example 3.—Cyclic Oligomers of N-Phenethylaziridine

In like manner, the light yellow liquid mixture of the cyclic dimer, trimer and tetramer were obtained as the predominant products in good yields.

Examples 4–11

The process of Example 1 was essentially duplicated except that other catalysts were used in a series of runs. The results are summarized in Table I.

TABLE I

| Example | Catalyst | Percent conversion | Cyclic oligomer, percent yield | | | |
|---|---|---|---|---|---|---|
| | | | Dimer | Trimer | Tetramer | Highers |
| 4 | $(CH_3)_3$—Al | 89.3 | 22.9 | 21.5 | 44.9 | |
| 5 | $(C_2H_5)_3$—Al | 93.0 | 20.2 | 16.8 | 55.4 | |
| 6 | $(n\text{-}C_3H_7)_3$—Al | 82.4 | 17.1 | 18.6 | 45.9 | 0.8 |
| 7 | $(n\text{-}C_4H_9)_3$—Al | 92.6 | 32.8 | 15.3 | 45.5 | 1.0 |
| 8 | $(i\text{-}C_4H_9)_3$—Al | 92.0 | 22.0 | 7.7 | 61.0 | 1.3 |
| 9 | $(n\text{-}C_6H_{13})_3$—Al | 91.1 | 45.1 | 7.0 | 35.7 | 3.2 |
| 10 | $(C_2H_5)_2$—Al—Cl | 99.0 | 88.0 | | 11.0 | |
| 11 | $(i\text{-}C_4H_9)_2$—Al—H | 42.2 | 7.2 | 10.2 | 22.5 | 2.4 |

We claim:
1. A process for preparing a cyclic oligomer corresponding to the formula

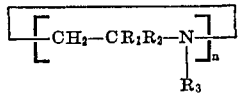

wherein $R_1$ and $R_2$ are hydrogen, methyl or ethyl, $R_3$ is an alkyl or aralkyl hydrocarbon radical of from 2 to 12 carbon atoms, and $n$ is an integer of from 2 to 10, said process comprising reacting by contacting, in liquid phase and under essentially anhydrous conditions and at a temperature of from about 125° C. to about 200° C., (a) an aziridine corresponding to the formula

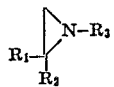

wherein $R_1$–$R_3$ have the aforesaid meaning, with (b) an alkyl aluminum catalyst having a total content of up to 18 carbon atoms which is selected from the group consisting of trialkyl aluminus, alkyl aluminum chlorides and alkyl aluminum hydrides.

2. The process defined in Claim 1 wherein (b) is trialkylaluminum.

3. The process defined in Claim 2 wherein each alkyl moiety in (b) is an alkyl of from 1 to 4 carbon atoms.

4. The process defined in Claim 3 wherein each alkyl moiety in (b) is ethyl or isobutyl.

5. The process defined in Claim 1 wherein $R_1$ and $R_2$ are each hydrogen.

6. The process defined in Claim 1 wherein $R_3$ is ethyl, propyl, butyl, benzyl, or phenethyl.

7. The process defined in Claim 1 wherein the reaction temperature is from about 140° C. to about 160° C.

8. The process defined in Claim 7 wherein $R_1$ and $R_2$ are each hydrogen, $R_3$ is ethyl or phenethyl and (b) is triethyl or triisobutylaluminum.

9. The process defined in Claim 1 wherein (b) is trimethylaluminum, triethylaluminum, tripropylaluminum, tributylaluminum, triisobutylaluminum, trihexylaluminum, dimethylethylaluminum, dipropylmethylaluminum, dimethylaluminum hydride, dibutylaluminum hydride, diisobutylaluminum hydride, dimethylaluminum chloride or diethylaluminum chloride.

References Cited
UNITED STATES PATENTS 3,492,289  1/1970  Symm et al. ——————  260—239 E
3,485,818  12/1969  Thompson ——————  260—239 BC

OTHER REFERENCES

Tsuboyama et al.: Tetrahedron Letters No. 16, pp. 1367–1370 (1970).
Dermer et al.: Ethylenimine and other aziridines (Academic Press, 1969), pp. 317–322 and 327–332.
Hansen et al.: J. Het. Chem., vol. 5, p. 305 (1968).

JOSEPH A. NARCAVAGE, Primary Examiner

U.S. Cl. X.R.
252—185; 260—2

PO-1050
(5/69)

UNITED STATES PATENT OFFICE
CERTIFICATE OF CORRECTION

Patent No. 3,828,023                    Dated August 6, 1974

Inventor(s) Sally P. Cornier, Charles E. Wymore

It is certified that error appears in the above-identified patent and that said Letters Patent are hereby corrected as shown below:

Column 1, line 4, "Sally P. Cornier" should read
--Sally P. Ginter--;

Column 3, Table I, Example 6, Column 2, "82 4" should read --82.4--;

Column 3, line 58, "aluminus" should read
--aluminums--.

Signed and sealed this 10th day of December 1974.

(SEAL)
Attest:

McCOY M. GIBSON JR.
Attesting Officer

C. MARSHALL DANN
Commissioner of Patents